United States Patent
Reid et al.

(10) Patent No.: US 6,583,997 B1
(45) Date of Patent: Jun. 24, 2003

(54) ULTRA-WIDE INPUT RANGE SWITCHING POWER SUPPLY FOR CIRCUIT PROTECTION DEVICES

(75) Inventors: Paul A. Reid, Cedar Rapids, IA (US); Randall J. Gass, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 10/060,542

(22) Filed: Jan. 30, 2002

(51) Int. Cl.[7] .................. H02H 7/10; H02H 7/122

(52) U.S. Cl. .................. 363/50; 363/55; 363/56.05; 363/56.1; 363/97

(58) Field of Search .................. 363/50, 55, 56.01, 363/56.05, 56.1, 56.11, 56.09, 97

(56) References Cited

U.S. PATENT DOCUMENTS

| | | | | |
|---|---|---|---|---|
| 6,023,037 A | * | 2/2000 | Church et al. | 219/121.39 |
| 6,121,762 A | | 9/2000 | Ravon | 323/287 |
| 6,177,645 B1 | * | 1/2001 | Church et al. | 219/121.39 |
| 6,272,025 B1 | * | 8/2001 | Riggio et al. | 363/133 |

* cited by examiner

*Primary Examiner*—Bao Q. Vu
(74) *Attorney, Agent, or Firm*—Larry I. Golden

(57) ABSTRACT

A wide input range switching power supply for a circuit protection device includes a rectifier circuit for rectifying an AC line voltage at a supply input, and a switch-mode DC-to-DC converter coupled to the rectifier circuit for providing a low voltage DC power to a load at a supply output. The converter includes a switch having an open state and a closed state and a control circuit for controlling the state of the switch. The control circuit is operatively coupled to receive operating power from the supply output.

33 Claims, 5 Drawing Sheets

Fig. 6a - Prior Art
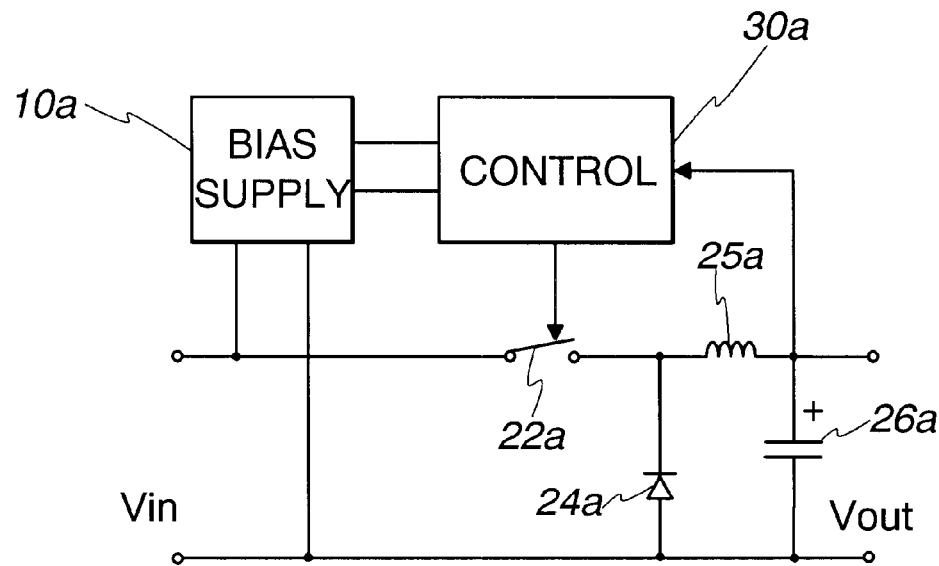
Fig. 6b
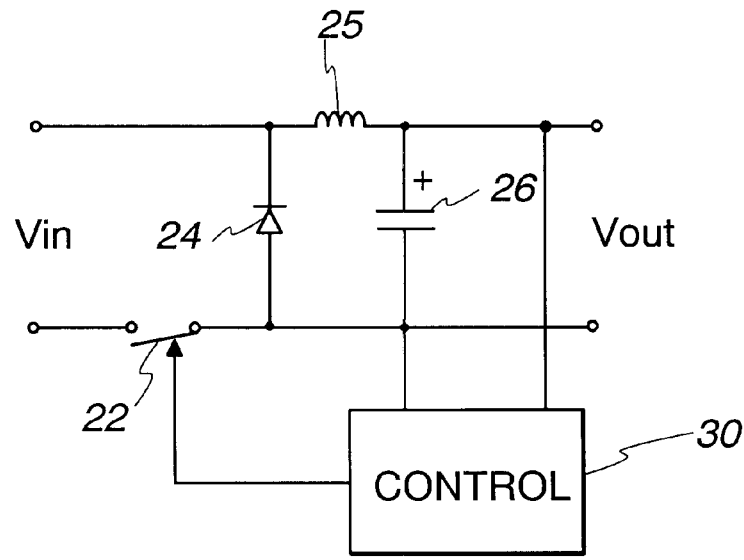

ULTRA-WIDE INPUT RANGE SWITCHING POWER SUPPLY FOR CIRCUIT PROTECTION DEVICES

FIELD OF THE INVENTION

This invention is directed generally to the power supply arts, and more particularly a novel ultra-wide input range switching power supply for circuit protection devices.

BACKGROUND OF THE INVENTION

Power supply designs for small circuit and personnel protection devices have environmental and operating constrains not common to most "conventional" line powered devices. Such a power supply should be designed such that 1) it survives and operates under the extreme line conditions typical for power systems including lightning induced surge events and wide voltage fluctuations, 2) efficiency is kept as high as possible to reduce the generation of excess heat, and 3) electronic trip drive circuitry for the circuit protection device is designed into the power supply to reduce the number of required components. The design discussed herein uses a novel approach to buck-type switching power converter that complies with susceptibility and input range requirements, minimizes power loss, and incorporates the drive circuitry for energizing a solenoid. A more detailed discussion of the problems solved follows.

Providing electronics with power throughout an extremely wide range of input voltage. A circuit performing fault detection in a circuit breaker must remain functional during the detection and tripping process. When a fault occurs, the input voltage to the power supply of a detection device may fall to low levels. The power supply must continue, under those conditions, to supply the electronics with the energy required to detect the fault and open the circuit. Previously, power supplies for circuit breakers operate under the conditions present in load centers where large conductors provide AC power. However, as the need for smart detection of arcing and other types of faults expands to include protection at the outlet or load device, voltage drop under fault conditions increases due to the added series impedance of smaller wiring. New designs will require wider input voltage operating ranges that meet these requirements.

Providing efficient power conversion. As the performance of "smart circuit protectors" such as arc detection circuits increases, so does the power requirement. Space constrains and heat generated from the circuit breaker itself leave little allowance for added heat dissipation from the electronics. In particular, the power supply must be efficient enough to do the required power conversion without dissipating excess heat. Previous designs for lower power circuits use a linear approach. Excessive power is lost in these designs when they are scaled for higher output power.

Providing a method for operating an in-line solenoid for tripping operation using the power supply switching transistor. The electronics in a circuit breaker ultimately provides protection by opening a set of contacts. Energizing a solenoid that provides mechanical force to delatch the mechanism holding the contacts generally does this. In the past, energizing this solenoid required a dedicated high current device that is switched on by the protection circuit.

U.S. Pat. No. 6,121,762 discloses a power supply scheme designed to minimize power consumption in the control circuit, and to eliminate the need for the isolation block between the control circuit and the switch. The invention proposed herein obtains similar results but differs from the above patent since the need for the local supply and control isolation is eliminated by the relocation of the switching element and a novel control scheme. Additionally, the invention proposed herein allows the supply switch to be used to drive a solenoid placed in the input filter circuit.

However, with this invention, no bias supply is required since the energy used to operate the switching transistor is derived directly from the supply output itself. This results in an optimization of efficiency and a reduction of parts count when compared to previous designs that use a bias-supplied switch controlled circuit. Additionally, output regulation can be achieved over an extremely wide range of input voltages (10:1 or more).

Previous designs have achieved a range of approximately 2:1. The extra wide range capability is made possible because the only constraints on input voltage are that 1) the peak input voltage does not exceed a value that would cause a violation of component ratings, and 2) that the input voltage has an rms value that is a few volts above the regulated output voltage.

A solenoid is placed in-line with the power supply and can be driven through the power supply regulation circuitry with the addition of one small-signal transistor. Previous designs required a separate SCR or TRIAC and driving circuitry.

The elimination of the bias supply requirement and the ability to drive a solenoid with the power supply switching transistor were made possible by moving the switching element from the classic buck converter location on the high-side to the low-side. A novel combination of components was then used for the low-side switch control scheme that derives its power and voltage feedback from the supply output. The supply control circuit remains powered under solenoid trip operation due to a clamped output condition, further described below.

The invention has a number of potential applications including, but not limited to, arc fault protection circuit breakers; electronic trip units; and arc fault protected devices such as wall sockets, outlet strips, electrical appliances and the like.

SUMMARY OF THE INVENTION

Briefly, in accordance with the foregoing, a wide input range switching power supply apparatus for a circuit protection device comprises a supply input, a rectifier circuit for rectifying an AC line voltage at the supply input, and a switch-mode DC-to-DC converter coupled to the rectifier circuit for providing a low voltage DC power to a load at a supply output, the converter comprising a switch having an open state and a closed state and a control circuit for controlling the state of the switch, wherein the control circuit is operatively coupled to receive operating power from the supply output.

In accordance with another aspect of the invention, a wide input range switching power supply for a circuit protection device comprises a rectifier circuit for rectifying an AC line voltage, and a switch-mode DC-to-DC converter coupled to the rectifier circuit for providing a low voltage DC power to a load, the converter comprising a switch having an open state and a closed state and a control circuit for controlling the state of the switch, and an input filter operatively coupled with the rectifier circuit, the input filter including a solenoid coil also operative for driving a trip mechanism of the circuit protection device.

In accordance with another aspect of the invention, a circuit protection device comprises a detection device for detecting a predetermined condition in a circuit, a trip mechanism operatively coupled with said detection device for opening and closing a current path to a circuit to be protected by the circuit protection device, a solenoid coil for energizing the trip mechanism, and a wide input range switching power supply comprising a supply input, a rectifier circuit for rectifying an AC line voltage at the supply input, and a switch-mode DC-to-DC converter coupled to the rectifier circuit for providing a low voltage DC power to a supply output, the converter comprising a switch having an open state and a closed state and a control circuit for controlling the state of the switch; wherein the control circuit is operatively coupled to receive operating power from the supply output.

In accordance with another aspect of the invention, a circuit protection device comprises a detection device for detecting a predetermined condition in a circuit to be protected, a trip mechanism operatively coupled with said detection device for opening and closing a current path to a circuit to be protected by the circuit protection device, a solenoid coil for energizing the trip mechanism, and a wide input range switching power supply comprising a supply input, a rectifier circuit for rectifying an AC line voltage at the supply input, and a switch-mode DC-to-DC converter coupled to the rectifier circuit for is providing a low voltage DC power at a supply output, the converter comprising a switch having an open state and a closed state and a control circuit for controlling the state of the switch, and an input filter operatively coupled with the rectifier circuit, the input filter including the solenoid coil.

In accordance with another aspect of the invention, a method for supplying power to a circuit protection device over a wide input range comprises rectifying an AC line voltage at a supply input, providing a low voltage DC power to a load using a switchmode DC-to-DC converter, including a switch having an open state and a closed state and a control circuit for controlling the state of the switch, and filtering the rectified AC line voltage using a filter including a solenoid coil also operative for driving a trip mechanism of the circuit protection device.

In accordance with another aspect of the invention, a wide input range switching power supply apparatus for a circuit protection device comprises a supply input, means for rectifying an AC line voltage at the supply input, and converter means coupled to the means for rectifying for providing a low voltage DC power to a supply output, the converter means comprising switch means having an open state and a closed state and a control circuit for controlling the state of the switch means, wherein the control circuit means is operatively coupled to receive operating power from the supply output.

In accordance with another aspect of the invention, a wide input range switching power supply for a circuit protection device comprises means for rectifying an AC line voltage, converter means coupled to the means for rectifying for providing a low voltage DC power to a supply output, the converter means comprising switch means having an open state and a closed state and control circuit means for controlling the state of the switch means, and means for filtering the rectified AC line voltage including a solenoid coil also operative for driving a trip mechanism of the circuit protection device.

In accordance with another aspect of the invention, a circuit protection device comprises trip means for opening and closing a current path to a circuit to be protected by the circuit protection device, a solenoid coil for energizing the trip means, and a wide input range switching power supply apparatus comprising a supply input, means for rectifying an AC line voltage at the supply input and converter means for providing a low voltage DC power to a supply output, the converter means comprising switch means having an open state and a closed state and control circuit means for controlling the state of the switch means, wherein the control circuit means is operatively coupled to receive operating power from the supply output.

In accordance with another aspect of the invention, a method for supplying power to a circuit protection device over a wide input range comprises rectifying an AC line voltage at a supply input, providing a low voltage DC power to a supply output using a switch-mode DC-to-DC converter including a switch having an open state and a closed state and a control circuit for controlling the state of the switch, and operatively coupling the control circuit for receiving operating power from the supply output.

In accordance with another aspect of the invention, a circuit protection device comprises a trip means for opening and closing a current path to a circuit to be protected by the circuit protection device, a solenoid coil for energizing the trip means, and a wide input range switching power supply comprising means for rectifying an AC line voltage, converter means coupled to the means for rectifying for providing a low voltage DC power to a supply output, the converter means comprising switch means having an open state and a closed state and control circuit means for controlling the state of the switch means, and means for filtering the rectified AC line voltage including said solenoid coil.

BRIEF DESCRIPTION OF THE DRAWINGS

In the drawings:

FIGS. 6a and 6b are simplified circuit diagrams illustrating a conventional buck converter circuit configuration and a buck converter in accordance with an embodiment of the invention.

DETAILED DESCRIPTION OF THE ILLUSTRATED EMBODIMENT

In accordance with one aspect of the invention, a switch mode type power supply efficiently converts AC line voltage to a low voltage DC level while providing a means to operate an included trip solenoid. Due to environmental constrains the invention uses as few components as possible while generating as little excess heat as possible. The invention has been developed to operate an industrial temperature range environment from a single phase, 120 Vac (49–132 Vac range), 50/60 Hz power source, however, the invention can also operate from DC power in the same range or can have components scaled for other voltage ranges. The embodiment of the supply described hereinbelow has been developed for a 4–6 volt output at approximately 0.15 watts but components can be scaled to increase or decrease output voltage and output power capability depending on the load requirements. The invention is particularly useful for arc-fault detecting circuit protectors.

The invention can be described as a switch mode or buck type switching power converter that incorporates a solenoid coil as part of the input filter. The novel approach used to control the switching device in the buck converter eliminates the need for a power-consuming bias supply and allows an external stimulus to lock on the switching device in order to provide operating (i.e., trip) current to the solenoid.

Figure 1:
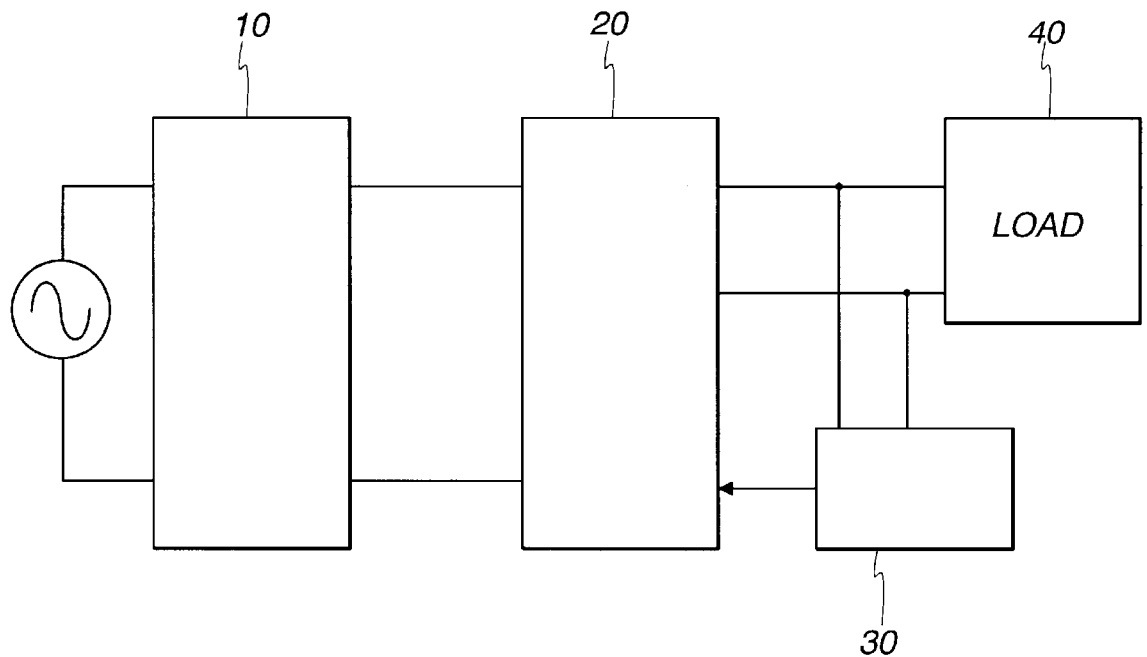
FIG. 1 is a simplified block diagram illustrating a switching power supply in accordance with the invention.

As a general overview, consider the illustration in FIG. 1. A single-phase AC source is applied at an input section 10 filter and rectifier (and trip solenoid 12—see FIG. 2) where the AC is filtered and rectified. The resulting rectified DC is of a magnitude close to the peak voltage of the incoming AC waveform. A buck-type DC-DC converter section 20 converts the rectified DC to a low voltage determined and regulated by a control circuit 30. The load 40 comprises the electronics of a circuit protection device (e.g., an arc fault and/or ground fault detector).

Figure 2:
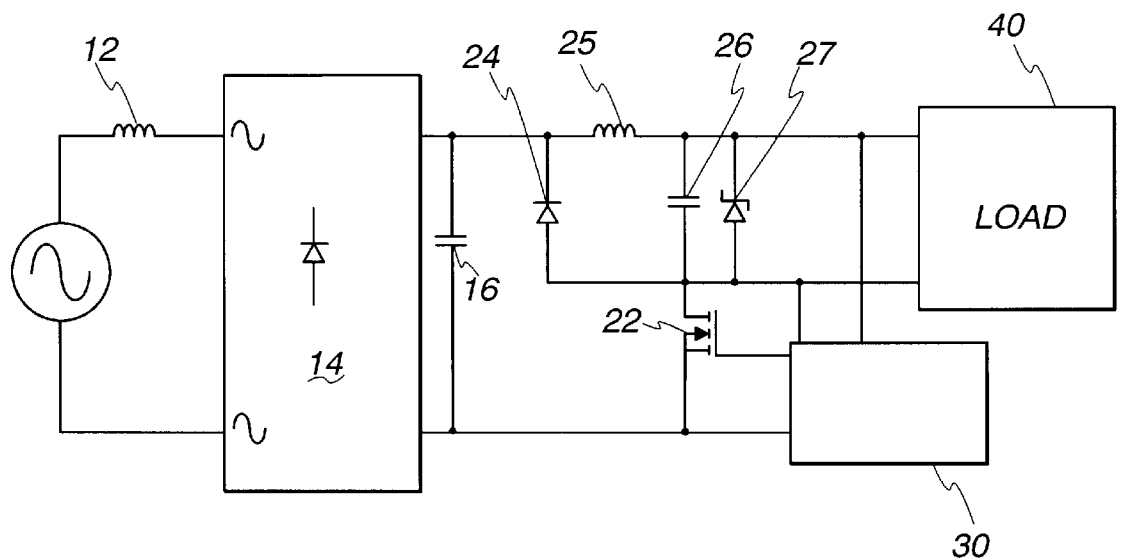
FIG. 2 is a diagram similar to FIG. 1 showing the circuit portions 10 and 20 of FIG. 1 in schematic form.

Sections 10 and 20 are shown in schematic form in FIG. 2. Section 10 in FIG. 2 is represented by components 12, 14, and 16. An input filter formed by solenoid coil 12 and capacitor 16 serves several functions including suppression of conducted emissions and smoothing of the rectified AC. The solenoid coil 12 also drives the trip mechanism (not shown) of a circuit protection device for which the power supply of the invention provides DC power. Additionally, solenoid 12 serves as an impedance bump for surge suppression and capacitor 16 provides additional energy storage that is transferred to a buck converter output filter comprising inductor 25 and capacitor 26 when a switch 22 is closed. The incoming AC is rectified by bridge rectifier 14.

Figure 3A:
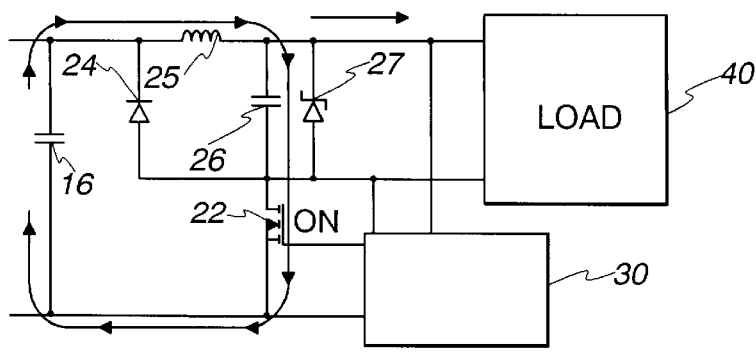
FIGS. 3a–3d illustrate four modes of operation of the circuit of FIGS. 1 and 2.
Figure 3B:
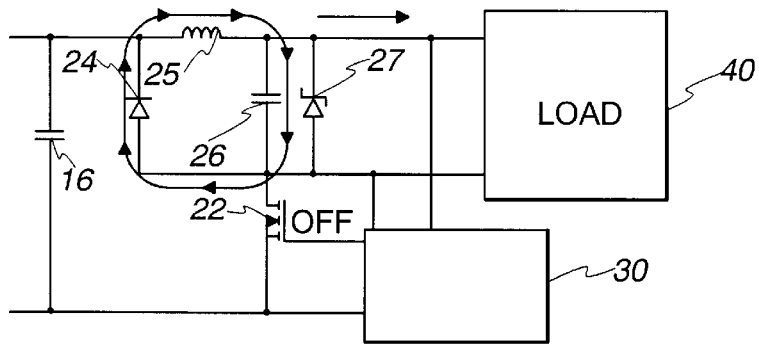

Components 24, 25, 26, 27 and 22 form a buck-type DC to DC converter in section 20. FIGS. 3a, 3b, 3c, and 3d illustrate four modes of operation for this section of the power supply. In FIG. 3a, a switching transistor 22 is turned on to force current to flow from capacitor 16 through inductor 25 and capacitor 26. Inductor 25 limits the rise in current as capacitor 26 is charged. Once a preset upper voltage limit is reached at capacitor 26, the control section 30 turns off transistor 22. The energy stored in the inductor 25 causes current to circulate through capacitor 26 and rectifier 24 (FIG. 3b) until it reduces to 0, or until capacitor 26 is discharged by the load to a lower voltage threshold where transistor 22 is turned on again by the control section 30.

Figure 3C:
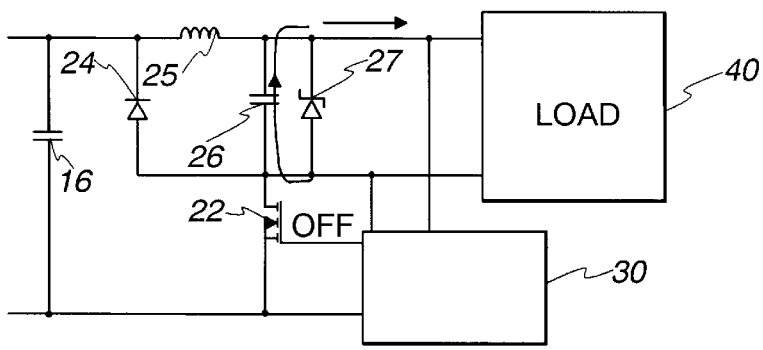
Figure 3D:
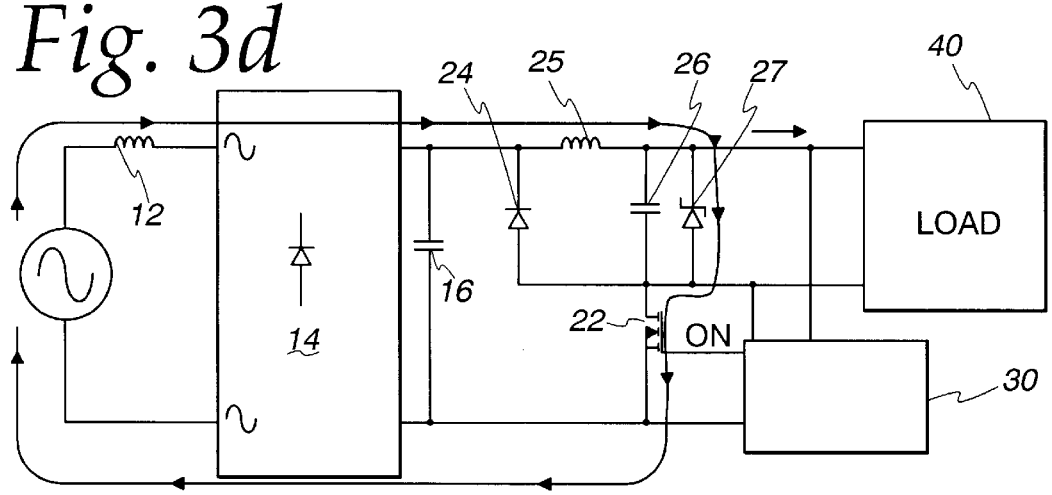

The input filter capacitor 16 is replenished during the time that transistor 22 is off. If the component values are such that the circuit operates in discontinuous mode, the current in the inductor 25 will fall to 0 and, as shown by FIG. 3c, the only current flow is from the output capacitor 26 to the load 40. Once the output capacitor 26 has been discharged past the lower threshold of the control circuit 30, the process will start over at FIG. 3a. In the mode of operation used for solenoid activation (FIG. 3d), transistor 22 is turned on continuously in response to a trip signal produced by the protection electronics (load) 40, increasing the voltage across capacitor 26 until it is clamped by zener diode 27 and then saturating inductor 25. The resulting increased current flow through one coil 12 operates the solenoid coil 12.

Figure 4:
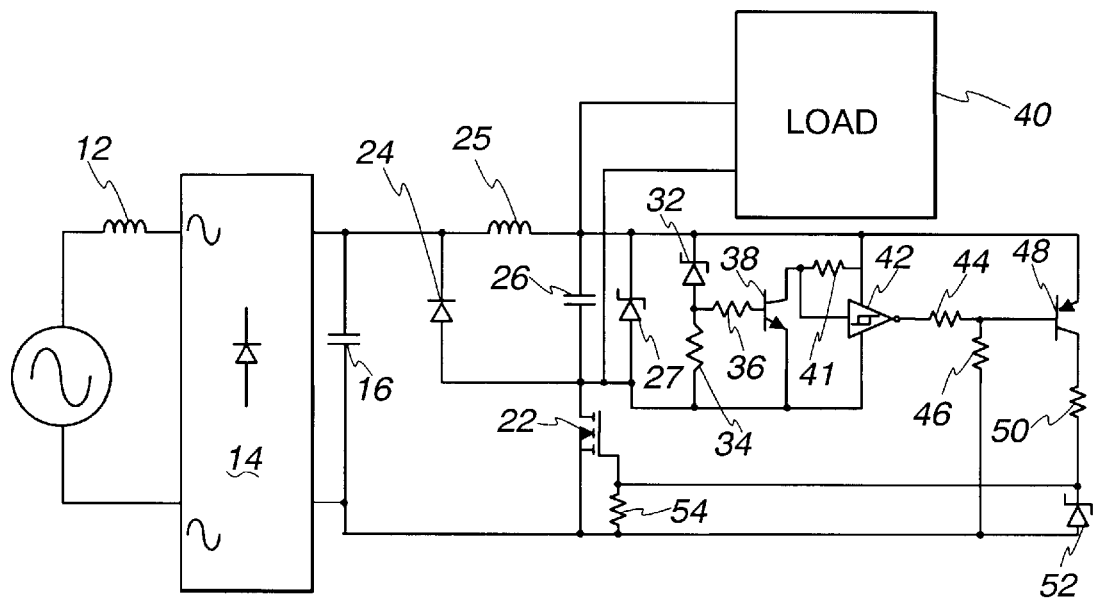
FIG. 4 is a full schematic diagram of one embodiment of the circuit of FIG. 1.

FIG. 4 shows a schematic diagram for the entire power supply including control section 30. The control section 30 comprises components 32, 34, 36, 38, 41, 42, 44, 46, 48, 50, 52 and 54, and regulates the voltage across the output capacitor 26 by turning on or off the transistor switch 22. Output voltage monitoring is achieved with zener diode 32, resistors 34, 36 and transistor 38. If the voltage at capacitor 26 is less than the zener voltage of zener diode 32 plus the forward Vbe drop in transistor 38, current flowing into the base of transistor 38 is essentially reduced to zero. This significantly reduces the collector current, allowing the collector voltage to be pulled up by resistor 41 to near the positive side of the output supply voltage. As the collector voltage surpasses the upper input threshold of a schmitt trigger inverter 42, the inverter 42 output changes to the low state. This pulls current through the emitter-base junction of transistor 48. The gate of the switching transistor 22 is charged through a resistive divider 50, 54 as the PNP transistor 48 begins to turn on. Zener diode 52 serves as an over-voltage clamp to protect the gate of the switching transistor under initial turn-on conditions. Since turning on the switching transistor 22 essentially places all the input voltage across inductor 25, the voltage across resistor 50 is immediately reduced to a level slightly above the supply output voltage.

Turning the switching transistor 22 off occurs with the reversal of the above process. As the voltage at the output capacitor 26 increases to the point where sufficient current is flowing through zener diode 32 and the base-emitter junction of transistor 38, the collector voltage at transistor 38 is pulled down to near the negative side of the supply output. The voltage at the input to the Schmitt trigger inverter 42 passes the lower threshold and the output goes high, turning transistor 38 off and allowing the gate charge at transistor 22 to discharge through resistor 54.

When the voltage is first applied to the input, all voltages in the supply including the output capacitor 26 are sitting at or near zero volts. Resistor 46 is used to "bootstrap" the power supply by slightly forward biasing transister 48 allowing the gate of transistor 22 to charge. The output capacitor 26 is charged as transistor 22 begins to conduct. A small voltage at capacitor 26 is all that is required for the control circuit 30 to take over control on its own. The resistance of resistor 46 is made large enough that very little power is consumed by resistor 46 during normal supply operation.

Figure 5:
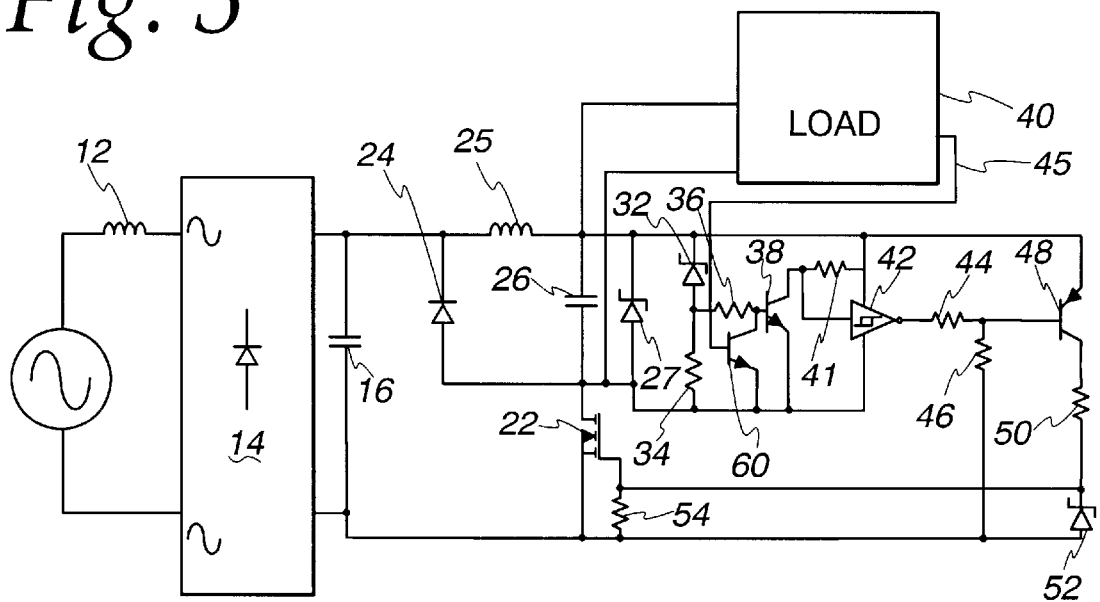
FIG. 5 is a full schematic diagram of a second embodiment of the circuit of FIG. 1.

The solenoid trip function of the control section 30 is achieved with the addition of a small signal transistor 60 as shown in FIG. 5. When the base of this transistor 60 is energized from the load (protection) electronics 40 (e.g., a trip signal from arc fault and/or ground fault or grounded neutral detection electronics), transistor 22 is turned on continuously, causing high currents to flow through the solenoid 12 in the input filter. Excessive output voltage is clamped with zener diode 27 as explained above.

Figure 4A:
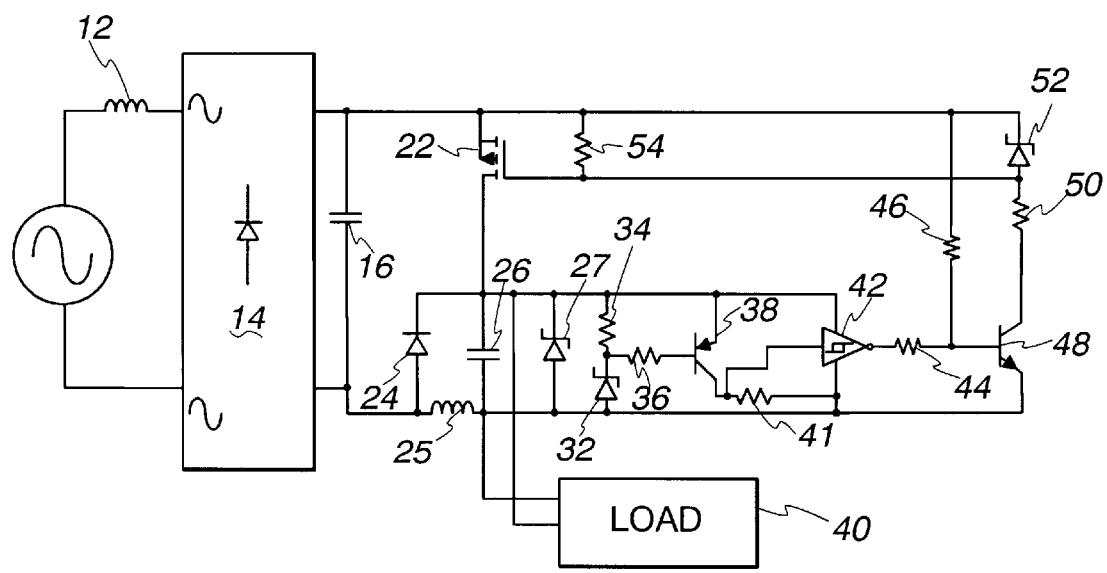
FIG. 4a is another embodiment of the circuit of FIG. 4.
Figure 5A:
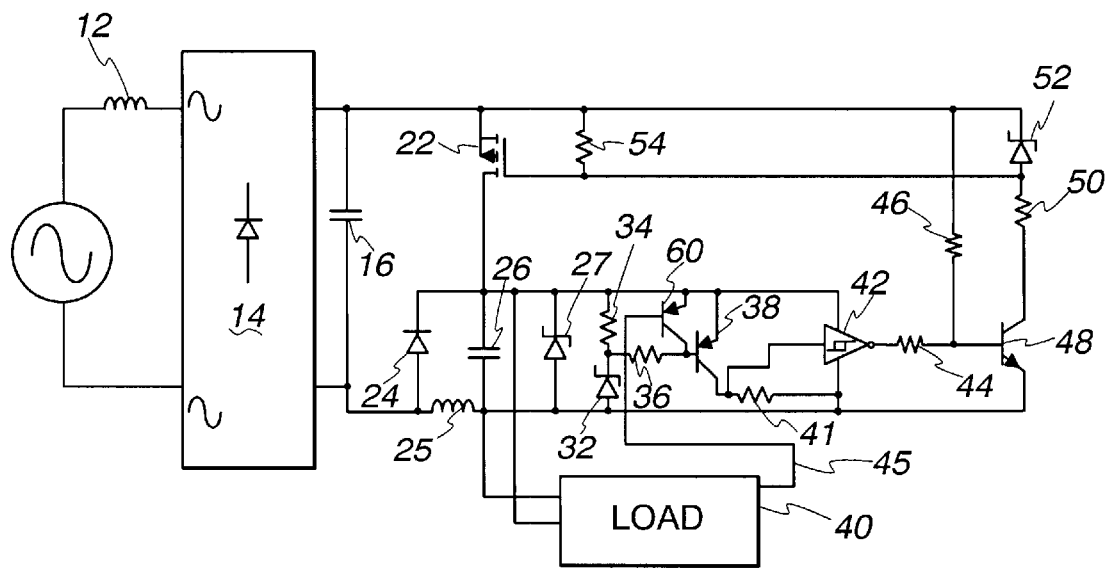
FIG. 5a is another embodiment of the circuit of FIG. 5.

FIGS. 4a and 5a are additional embodiments of the circuits in FIG. 4 and FIG. 5 that result when the diagrams are "inverted," i.e., all diodes are reversed, and the transistors are replaced with their complementary devices (an NPN transistor becomes a PNP and vice versa). This circuit produces the same results with all components serving the same functions. The drawing FIG. 4a is the complement of FIG. 4 and FIG. 5a is the complement of FIG. 5. Accordingly, like reference numerals designate like components in FIGS. 4a and 5a.

Referring to FIGS. 6a and 6b, a simplified functional illustration of a conventional converter circuit (FIG. 6a) illustrates the manner in which the circuit of the invention (FIG. 6b) differs in the placement of the switching and control components. In the circuit of FIG. 6a, similar reference numerals have been utilized to those utilized in the above described figures with the suffix a. In FIG. 6a, it will be seen that the control circuit 30a and switching element 22a are located on the high or positive side of the bias supply 10a. In contrast, in FIG. 6b, the switching element and control circuit 30 are located on the low side of the input voltage or bias supply. The components 24, 25 and 26, described more fully hereinabove, are located in the same configuration relative to the output voltage in both diagrams. However, it will be seen that the switch 22 is located at the low side of these components in the circuit of the invention shown in FIG. 6b, in contrast to the location of switch 22a as shown in FIG. 6a.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A wide input range switching power supply apparatus for a circuit protection device for protecting an external circuit, the power supply comprising:
    a supply input;
    a rectifier circuit for rectifying an AC line voltage at the supply input;
    a switch-mode DC-to-DC converter coupled to the rectifier circuit for providing a low voltage DC power to a load at a supply output, the converter comprising a switch having an open state and a closed state and a control circuit for controlling the state of the switch; and
    a solenoid coil also operative for driving a trip mechanism of said circuit protection device;
    wherein the control circuit is operatively coupled to receive operating power from the supply output.

2. The apparatus of claim 1 and further including an output filter circuit operatively coupled between the switch and the load.

3. The apparatus of claim 1 and further including a second switch operatively coupled to the switch for turning on the switch continuously to cause continuous current to flow through the solenoid coil.

4. The apparatus of claim 1 which includes a full-wave rectifier and wherein the switch is coupled between a low voltage connection on the DC side of said rectifier and a low voltage side of the supply output.

5. A wide input range switching power supply for a circuit protection device, the power supply comprising:
    a rectifier circuit for rectifying an AC line of voltage; and
    a switch-mode DC-to-DC converter coupled to the rectifier circuit for providing a low voltage DC power to a load, the converter comprising a switch having an open state and a closed state and a control circuit for controlling the state of the switch; and
    an input filter operatively coupled with the rectifier circuit, the input filter including a solenoid coil also operative for driving a trip mechanism of the circuit protection device.

6. A circuit protection device comprising:
    a detection device for detecting a predetermined condition in a circuit to be protected;
    a trip mechanism operatively coupled with said detection device for opening and closing a current path to a circuit to be protected by the circuit protection device;
    a solenoid coil for energizing the trip mechanism; and
    a wide input range switching power supply comprising a supply input, a rectifier circuit for rectifying an AC line voltage at the supply input, and a switch-mode DC-to-DC converter coupled to the rectifier circuit for providing a low voltage DC power to a supply output, the converter comprising a switch having an open state and a closed state, and a control circuit for controlling the state of the switch; wherein the control circuit is operatively coupled to receive operating power from the supply output.

7. The device of claim 6 and further including an input filter operatively coupled with the rectifier circuit, the input filter including the solenoid coil.

8. The device of claim 6 and further including an output filter circuit operatively coupled between the switch and the load.

9. The device of claim 8 and further including a second switch operatively coupled to the switch for turning on the switch continuously to cause continuous current to flow through the solenoid coil, in response to said detection device.

10. The power supply of claim 5 which includes a full-wave rectifier and wherein the switch means is coupled between a low voltage connection on the DC side of said rectifier and a low voltage side of the supply output.

11. The device of claim 6 wherein the switch is coupled between a low voltage side of the AC line and a low voltage side of the supply output.

12. A circuit protection device comprising:
    a detection device for detecting a predetermined condition in a circuit to be protected;
    a trip mechanism operatively coupled with said detection device for opening and closing a current path to a circuit to be protected by the circuit protection device;
    a solenoid coil for energizing the trip mechanism; and
    a wide input range switching power supply comprising a supply input, a rectifier circuit for rectifying an AC line voltage at the supply input, and a switch-mode DC-to-DC converter coupled to a the rectifier circuit for providing a low voltage DC power to a supply output, the converter comprising a switch having an open state and a closed state and a control circuit for controlling the state of the switch, and an input filter operatively coupled with the rectifier circuit, the input filter including the solenoid coil.

13. The device of claim 12 which includes a full-wave rectifier and wherein the switch is coupled between a low voltage connection on the DC side of said rectifier and a low voltage side of the supply output.

14. A method for supplying power to a circuit protection device over a wide input range, the method comprising:
    rectifying an AC line voltage at a supply input;
    providing a low voltage DC power to a load using a switch-mode DC-to-DC converter, including a switch having an open state and a closed state and a control circuit for controlling the state of the switch; and
    filtering the rectified AC line voltage using a filter including a solenoid coil also operative for driving a trip mechanism of the circuit protection device.

15. The method of claim 14 and further including coupling the switch between the rectified AC line voltage and a low voltage side of the supply output.

16. A wide input range switching power supply apparatus for a circuit protection device for protecting an external circuit, the power supply comprising:

a supply input;

means for rectifying an AC line voltage at the supply input;

converter means coupled to the means for rectifying for providing a low voltage DC power to a supply output, the converter means comprising switch means having an open state and a closed state and control circuit means for controlling the state of the switch means; and a solenoid coil also operative for driving a trip mechanism of the circuit protection device;

wherein the control circuit means is operatively coupled to receive operating power from the supply output.

17. The apparatus of claim 16 and further including filter means operatively coupled between the switch means and the supply output.

18. The apparatus of claim 16 and further including second switch means operatively coupled to the switch means for turning on the switch means continuously to cause continuous current to flow through the solenoid coil.

19. The apparatus of claim 16 which includes a full-wave rectifier and wherein the switch means is coupled between a low voltage connection on the DC side of said rectifier and a low voltage side of the supply output.

20. A wide input range switching power supply for a circuit protection device, the power supply comprising:

means for rectifying an AC line voltage;

converter means coupled to the means for rectifying for providing a low voltage DC power to a supply output, the converter means comprising switch means having an open state and a closed state and control circuit means for controlling the state of the switch means;

wherein the control circuit means is operatively coupled to receive operating power from the supply output; and means for filtering the rectified AC line voltage including a solenoid coil also operative for driving a trip mechanism of the circuit protection device.

21. The power supply of claim 20 which includes a full-wave rectifier and wherein the switch means is coupled between a low voltage connection on the DC side of said rectifier and a low voltage side of the supply output.

22. A circuit protection device comprising:

trip means for opening and closing a current path to a circuit to be protected by the current protection device;

a solenoid coil for energizing the trip means; and a wide input range switching power supply apparatus comprising a supply input, means for rectifying an AC line voltage at the supply input and converter means for providing a low voltage DC power to a supply output, the converter means comprising switch means having an open state and a closed state and control circuit means for controlling the state of the switch means;

wherein the control circuit means is operatively coupled to receive operating power from the supply output.

23. The device of claim 22 and further including a means for filtering the rectified AC line voltage including said solenoid coil.

24. The device of claim 23 and further including output filter means operatively coupled between the switch means and the supply output.

25. The device of claim 22 which includes a full-wave rectifier and wherein the switch means is coupled between a low voltage connection on the DC side of said rectifier and a low voltage side of the supply output.

26. The device of claim 22 and further including second switch means operatively coupled to the switch means for turning on the switch means continuously to cause continuous current to flow through the solenoid coil.

27. A method for supplying power to a circuit protection device for protecting an external circuit over a wide input range, the method comprising:

rectifying an AC line voltage at a supply input;

providing a low voltage DC power to a supply output using a switch-mode DC-to-DC converter, including a switch having an open state and a closed state and a control circuit for controlling the state of the switch;

driving a trip mechanism of the circuit protection device; and operatively coupling the control circuit for receiving operating power from the supply output.

28. The method of claim 27 and further including filtering the rectified AC line voltage using a filter including a solenoid coil also operative for driving a trip mechanism of the circuit protection device.

29. The method of claim 27 and further including operatively coupling an output filter circuit between the switch and the supply output.

30. The method of claim 27 and further including selectively turning on the switch continuously to cause continuous current to flow through the solenoid coil under predetermined conditions.

31. The method of claim 27 and further including coupling the switch between the rectified AC line voltage and a low voltage side of the supply output.

32. A circuit protection device comprising:

a trip means for opening and closing a current path to a circuit to be protected by the circuit protection device;

a solenoid coil for energizing the trip means; and a wide input range switching power supply comprising means for rectifying an AC line voltage;

converter means coupled to the means for rectifying for providing a low voltage DC power to a supply output, the converter means comprising switch means having an open state and a closed state and control circuit means for controlling the state of the switch means; and means for filtering the rectified AC line voltage including said solenoid coil.

33. The device of claim 32 which includes a full-wave rectifier and wherein the switch means is coupled between a low voltage connection on the DC side of said rectifier and a low voltage side of the supply output.

* * * * *